UNITED STATES PATENT OFFICE.

GEORG KALISCHER, OF FRANKFORT-ON-THE-MAIN, GERMANY, ASSIGNOR TO CASSELLA COLOR COMPANY, OF NEW YORK, N. Y.

VAT DYE AND PROCESS OF MAKING SAME.

999,798.　　　　Specification of Letters Patent.　　Patented Aug. 8, 1911.

No Drawing.　　Application filed April 1, 1911.　Serial No. 618,395.

*To all whom it may concern:*

Be it known that I, GEORG KALISCHER, doctor of philosophy, a subject of the Kingdom of Prussia, and a resident of Frankfort-on-the-Main, Germany, have invented certain new and useful Improvements in Vat Dyes and Processes of Making Same, of which the following is a full description.

Whereas the $\alpha$-$\beta$ anthrimids which may be obtained by condensation of $\beta$-chloranthraquinone derivatives with $\alpha$-anthraquinone derivatives are useful vat colors, as may be seen from the description of Patent No. 863,397, the $\alpha$-$\alpha$-anthrimids resulting from the condensation of $\alpha$-chloranthraquinone derivatives with $\alpha$-amidoanthraquinone derivatives could not in practice be used as vat colors because their leuco products possess no affinity for cotton. I have now discovered that these $\alpha$-$\alpha$-anthrimids when heated with anhydrous aluminium chlorid, alone or in the presence of a diluting agent, are transformed into new compounds which are chemically absolutely different from the starting materials, and which possess the valuable property to dye cotton full brownish-orange to brown shades from easily soluble vats. It cannot be ascertained with certainty in which manner the reaction with aluminium chlorid takes place; it is however very probable that a condensation takes place while forming new inside (nucleus) aggregates. This conception is especially borne out by the considerable deepening of the shade of the color solutions of the new dyestuff (in concentrated sulfuric acid) as compared with those of the starting products. Whereas the starting products dissolve with a greenish color, the color of the solutions of the new dyestuff in concentrated sulfuric acid is an intense violet to blue. The sulfuric acid reaction is particularly characteristic for the new dyestuffs, and proves at the same time that they are absolutely different from the dyestuffs described in Patent No. 863,397.

The new dyestuffs are a dark powder in the dry state, insoluble in water and—contrary to the $\alpha$-$\alpha$-anthrimid used as the starting product—almost insoluble in the customary organic dissolving agents. When being treated with hydrosulfite and caustic soda lye, vats of a yellow to red color result, suited for dyeing cotton brownish-orange to brown shades of excellent fastness.

The process of working is illustrated by the following example:

Example: 10 kilos $\alpha$-$\alpha$-dianthraquinonyl .1.5.diamidoanthraquinone (obtained by condensing one molecular proportion of 1.5 diamidoanthraquinone with two molecular proportions of $\alpha$-chloranthraquinone) are thoroughly mixed with 50 kilos anhydrous aluminium chlorid, heated to 220–240° C. and maintained at this temperature until a sample dissolves in concentrated sulfuric acid with a purplish-blue color which does not increase in intensity. The product of reaction is then treated with hot water to remove the aluminium chlorid. The purified dyestuff represents a brownish-black powder insoluble in water. It is insoluble in hot anilin, but dissolves in cold concentrated sulfuric acid with a purplish-blue color; when diluting this solution with water, an orange-colored precipitate forms. In contradistinction thereto the $\alpha$-$\alpha$-dianthraquinonyl. 1.5 diamidoanthraquinone, used as the starting product, dissolves with a bluish-red color in hot anilin, and in concentrated sulfuric acid with a slightly greenish color. When diluting the sulfuric acid solution with water, dark red flakes are separating. When treated with hydrosulfite and caustic soda lye, the new dyestuff forms a vat of an orange-red color, and dyes therefrom cotton brownish-orange shades, fast against washing, chlorin, and light.

By heating other $\alpha$-$\alpha$-anthrimids with anhydrous aluminium chlorid, dyestuffs of similar properties are obtained. For instance the dyestuff prepared by starting from the $\alpha$-$\alpha$-dianthraquinonyl.1.8.diamidoanthraquinone (obtained by condensing 1.8 diamidoanthraquinone with $\alpha$-chloranthraquinone) dyes a greenish-brown, and the dyestuff from $\alpha$-anthraquinonyl.1.amidoanthraquinone (obtained by condensing $\alpha$-amidoanthraquinone with $\alpha$-chloranthraquinone) a brownish-olive, shade.

What I claim is:

1. The process of making new vat dyestuffs which consists in heating $\alpha$-$\alpha$ anthrimids (obtained by condensing an $\alpha$-amidoanthraquinone compound with an $\alpha$-chloranthraquinone compound) with anhydrous aluminium chlorid substantially as described.

2. The process of making a new vat dyestuff which consists in heating $\alpha$-$\alpha$-dianthraquinonyl.1.5.diamidoanthraquinone of the formula.

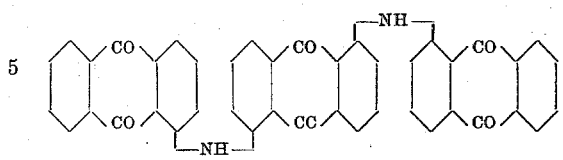

(obtained by condensing 1.5 diamidoanthraquinone with a-chloranthraquinone) with anhydrous aluminium chlorid substantially as described.

3. As new articles of manufacture the vat dyestuffs obtained by heating a-a-anthrimids (obtained by condensing an a-amidoanthraquinone compound with an a-chloranthraquinone compound) with anhydrous aluminium chlorid, said dyestuffs being in their dry state dark powders, insoluble in water, very little soluble in organic solvents, soluble in concentrated sulfuric acid with a violet to blue color, dyeing cotton from a yellow-to red-colored vat brownish-orange to brown shades fast to washing, chlorin, and light, substantially as described.

4. As a new article of manufacture, the vat dyestuff obtained by heating a-a-dianthraquinonyl.1.5.diamidoanthraquinone of the formula

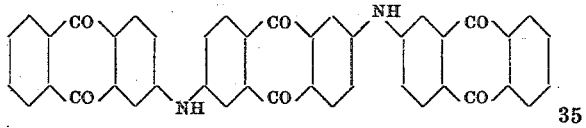

(obtained by condensing 1.5.diamidoanthraquinone with a-chloranthraquinone) with anhydrous aluminium chlorid, said dyestuff being a brownish-black powder, insoluble in water and hot anilin, soluble in concentrated sulfuric acid with a purplish-blue color, and being precipitated from such solution by addition of water, in the shape of orange flakes, dyeing cotton from an orange-red colored vat brownish-orange shades fast to washing, chlorin and light substantially as described.

In witness whereof I have hereunto signed my name this 21st day of March 1911, in the presence of two subscribing witnesses.

GEORG KALISCHER.

Witnesses:
 JEAN GRUND,
 CARL GRUND.